(12) United States Patent
Wang et al.

(10) Patent No.: US 9,203,795 B2
(45) Date of Patent: *Dec. 1, 2015

(54) MOBILE SOCIAL INTERACTION

(71) Applicant: Microsoft Technology Licensing, LLC, Redmond, WA (US)

(72) Inventors: Chun-Kai Wang, Bellevue, WA (US); Johnson Apacible, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/059,438

(22) Filed: Oct. 21, 2013

(65) Prior Publication Data
US 2014/0059137 A1    Feb. 27, 2014

Related U.S. Application Data

(63) Continuation of application No. 13/163,103, filed on Jun. 17, 2011, now Pat. No. 8,566,394.

(51) Int. Cl.
*G06F 15/16*    (2006.01)
*H04L 12/58*    (2006.01)
*G06Q 30/02*    (2012.01)

(52) U.S. Cl.
CPC .......... *H04L 51/32* (2013.01); *G06Q 30/0203* (2013.01)

(58) Field of Classification Search
CPC .................................................... H04L 51/046
See application file for complete search history.

(56) References Cited

U.S. PATENT DOCUMENTS

| | | |
|---|---|---|
| 2007/0209069 A1 | 9/2007 | Saklikar et al. |
| 2008/0253363 A1 | 10/2008 | Altberg et al. |
| 2009/0259642 A1 | 10/2009 | Cao et al. |
| 2010/0145976 A1 | 6/2010 | Higgins et al. |
| 2010/0312724 A1 | 12/2010 | Pinckney et al. |
| 2011/0106895 A1* | 5/2011 | Ventilla et al. ................. 709/206 |
| 2012/0215773 A1* | 8/2012 | Si et al. .......................... 707/723 |
| 2012/0323991 A1 | 12/2012 | Wang et al. |
| 2012/0331443 A1* | 12/2012 | Amid et al. .................... 717/104 |

OTHER PUBLICATIONS

Morris, et al., "What Do People Ask Their Social Networks, and Why? A Survey Study of Status Message Q&A Behavior", Retrieved Apr. 19, 2011 at <<http://people.csail.mit.edu/teevan/work/publications/papers/chi10-social.pdf>>, Proceedings of the 28th international conference on Human factors in computing systems, Apr. 10-15, 2010, 10 Pages.

(Continued)

*Primary Examiner* — Hua Fan
(74) *Attorney, Agent, or Firm* — Steve Wight; Judy Yee; Micky Minhas

(57) ABSTRACT

A question associated with a first user may be obtained. A search link may be determined based on content of the first question A response may be obtained. Updates to a content graph may be initiated, including an addition of a question node and a first link indicating asking of the question by the first user, and an addition of a response node and a second link indicating an answer relationship between the question and the response, and a third link indicating answering of the question from a second user, the second user associated with the first user via a friend link indicating a friend connection relationship between nodes associated with the first user and the second user.

20 Claims, 14 Drawing Sheets

(56) References Cited

OTHER PUBLICATIONS

Harper, et al., "Facts or Friends? Distinguishing Informational and Conversational Questions in Social Q&A Sites", Retrieved Apr. 19, 2011 at <<http://www-users.cs.umn.edu/~harper/publications/harper-chi2009.pdf>>, Proceedings of the 27th international conference on Human factors in computing systems, Apr. 4-9, 2009, 10 Pages.

Church, et al., "Social Search Browser: A Novel Mobile Search and Information Discover Tool", Retrieved Apr. 19, 2011 at <<http://karenchurch.com/papers/churchetal_iui2010.pdf>>, Proceedings of the 15th international conference on Intelligent user interfaces, 2010, pp. 1-10.

Horowitz, et al., "The Anatomy of a Large-Scale Social Search Engine", Retrieved Apr. 19, 2011 at <<http://rakaposhi.eas.asu.edu/cse494/aardvarkFinalWWW2010.pdf>>, Proceedings of the 19th international conference on World wide web (WWW 2010), 2010, 10 Pages.

"What Is Retweet? (RT)", Retrieved Jun. 17, 2011 at <<http://support.twitter.com/entries/77606-what-is-retweet-rt>>, Twitter, 2011, 4 Pages.

"Like Button," Retrieved Jun. 17, 2011 at <<http://developers.facebook.com/docs/reference/plugins/like/>>, Facebook, 2011, 5 Pages.

\* cited by examiner

300B

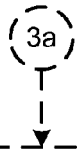

314 — Determine a content associated with the question and to determine the search link based on determining web sites associated with information associated with the content associated with the question 316 — Determine the first group of connection users based on one or more friend connections associated with the first user in a network or graph, wherein the search link includes a null value

318 — The question includes a query associated with one of a yes/no condition or an up/down vote condition, and the one or more first responses each include one of a yes/no value or an up/down vote value

320 — The second update includes an addition of a third node associated with the first response, a third link associating the third node with the first node, the third link indicating an answer relationship between the question and the first response

FIG. 3B

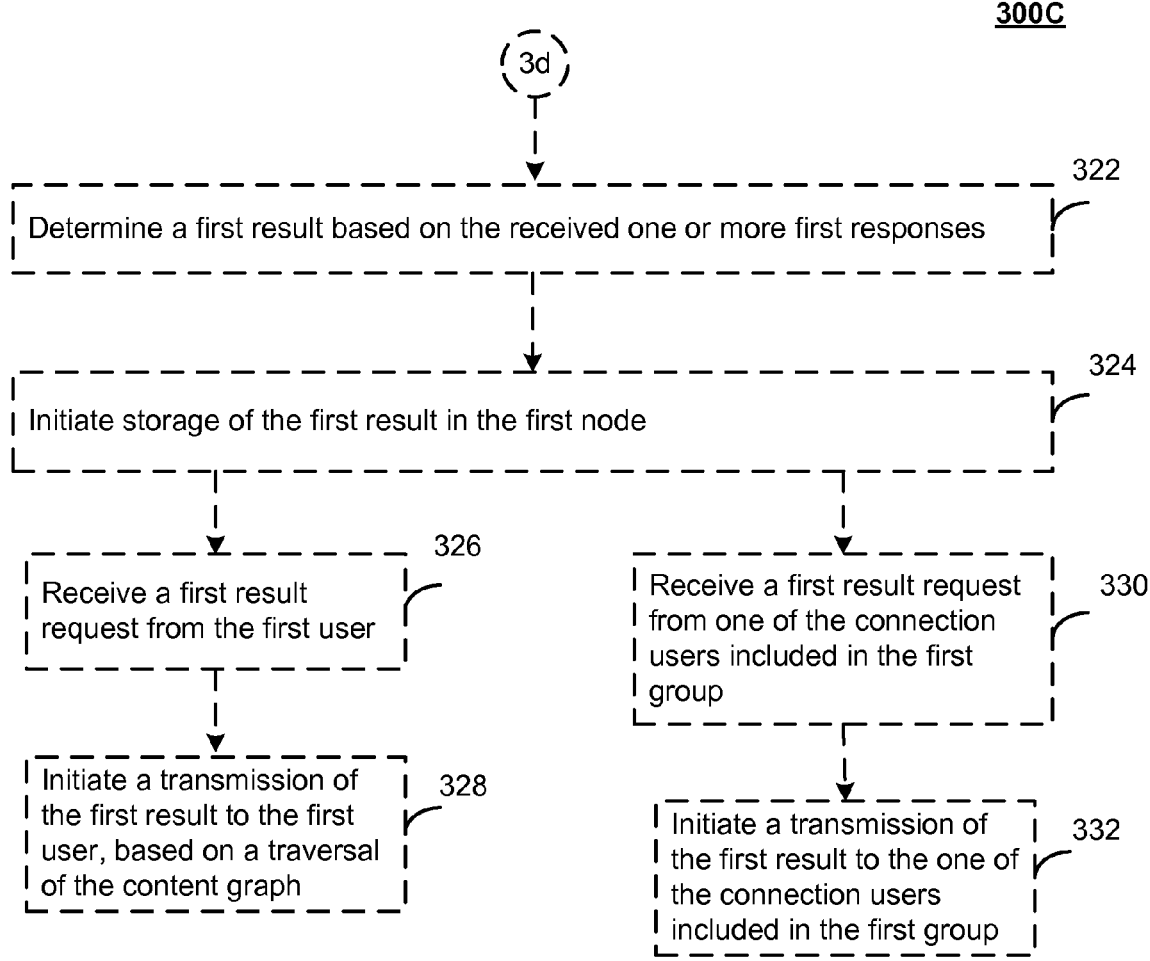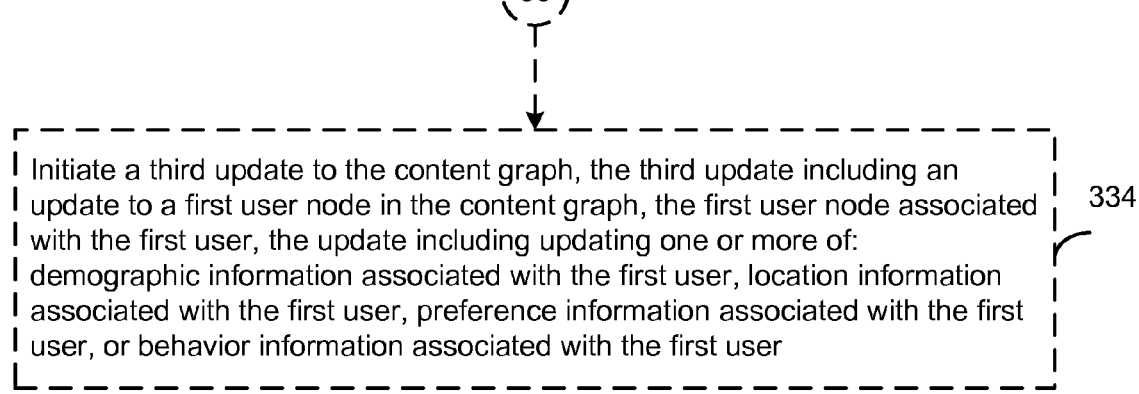
FIG. 3C

300D

336 — Determine a ranking of the connection users included in the first group based on comparing attributes associated with each of the connection users included in the first group and attributes associated with content of the question 338 — Determine the at least a portion of the first group of connection users based on the determined ranking 340 — Determine the ranking based on one or more of location information associated with the connection users, a connection user preference associated with the first user, location information associated with the first user, history information associated with the connection users, or history information associated with the first user 342 — receive an indication from the first user of an intent to generate a user question 344 — Determine one or more user suggestion questions based on accessing a first user node in the content graph, the first user node associated with the first user, based on one or more of a history of questions associated with the first user, one or more attributes associated with the first user, or a partial query received from the first user 346 — Initiate a transmission of the one or more user suggestion questions to a device associated with the first user

FIG. 3D

MOBILE SOCIAL INTERACTION

CROSS-REFERENCE TO RELATED APPLICATION

This application is a continuation of, and claims benefit from, commonly assigned, co-pending U.S. patent application Ser. No. 13/163,103, with inventors Chun-Kai Wang et al., filed Jun. 17, 2011, entitled "Mobile Social Interaction," which is hereby incorporated by reference herein in its entirety.

BACKGROUND

Many users of mobile devices are becoming increasingly dependent on their capabilities to provide information in real-time, as the user is moving through his/her daily activities. For example, the user may call other people, send and receive text messages, send and receive email, and engage in instant messaging interactions with others. As the users are making decisions throughout the day, they frequently prefer to obtain opinions from others, to provide some basis for consideration of their ultimate decisions. For example, if a user is debating whether to eat lunch at a restaurant that is located a few feet from where they are currently standing, he/she may wish that opinions from his/her friends were available with regard to the quality of food at the restaurant.

Similar questions may arise, for example, in the context of selecting movies or shows to watch, deciding what clothing to purchase, deciding what music to purchase for player devices. Other examples may include decisions regarding how to navigate to various geographic locations from a current location (based on opinions of friends), decisions regarding personal relationships (e.g., whether a marriage proposal is in order, whether to ask someone for a date), and decisions regarding personal opinions (e.g., who is liked/disliked by others, and why, who is best candidate in election campaign). For many scenarios, the user may desire an opinion in real-time, as he/she may only have a few minutes/seconds to ponder a decision (e.g., how to navigate, where to eat a meal, which movie to watch at a cinema). Making calls to friends and sending emails/messages may consume more time than the user has available for making the decision. Further, querying a search engine may provide opinion information regarding various entities, but the opinions may be those of people who are unknown personally to the user.

SUMMARY

According to one general aspect, a question processing manager may include a question input engine configured to receive a question from a first user. The question processing manager may also include a connection determination engine configured to determine a first group of connection users having a connection user association with the first user in a content graph. The question processing manager may also include a question dissemination engine configured to initiate a transmission of the question and a search link to each of at least a portion of the connection users included in the first group. The question processing manager may also include a response receiving engine configured to receive one or more first responses from one or more of the connection users included in the at least a portion of the connection users. The question processing manager may also include a graph update engine configured to initiate a first update to the content graph, the first update including an addition of a first node associated with the received question and a first link associating the first user with the first node, the first link indicating an action of asking the question, and initiate a second update to the content graph, the second update including an addition of a second link associating one of the connection users associated with one of the received first responses, with the first node, the first link indicating an action of answering the question.

According to another aspect, a first question associated with a first user may be obtained. A first update to a content graph may be initiated, via a device processor, the first update including an addition of a first question node associated with the obtained first question and a first link associating a first user node with the first question node, the first link indicating an action of asking the first question, the first user node associated with the first user. A search link may be determined based on content of the first question. A first response associated with the first question may be obtained. A second update to the content graph may be initiated, the second update including an addition of a first response node associated with the obtained first response, a second link associating the first response node with the first question node, the second link indicating an answer relationship between the first question and the first response, and a third link associating a second user node with the first question node, the third link indicating an action of answering the first question, the second user node associated with a second user, the second user node associated with the first user node via a first friend link indicating a friend connection relationship between the first user and the second user.

According to another aspect, a computer program product tangibly embodied on a computer-readable storage medium may include executable code that, when executed, may cause at least one data processing apparatus to receive a first question from a first device user, the first question associated with a request for responses to the first question from a group of connection users associated with the first device user via one or more friend connections to the first user in a content network. Further, the at least one data processing apparatus may initiate a transmission of the first question to a question processing service associated with the content network. Further, the at least one data processing apparatus may receive an indication of one or more results associated with the first question, the one or more results indicating responses associated with one or more responders included in the group of connection users. Further, the at least one data processing apparatus may receive a request for a response to a second question, the second question associated with a requesting connection user that is associated with the first device user via a friend connection to the first user in the content network, the request for the response including an indicator of one or more search links to descriptive information describing content included in the second question, the request for the response associated with a request for responses to the second question from a group of connection users associated with the requesting connection user via one or more friend connections to the requesting connection user in the content network. Further, the at least one data processing apparatus may receive the response to the second question from the first device user. Further, the at least one data processing apparatus may initiate a transmission of the response to the second question to the query processing service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 3A-3D are a flowchart illustrating example operations of the system of FIG. 1.

DETAILED DESCRIPTION

Figure 1:
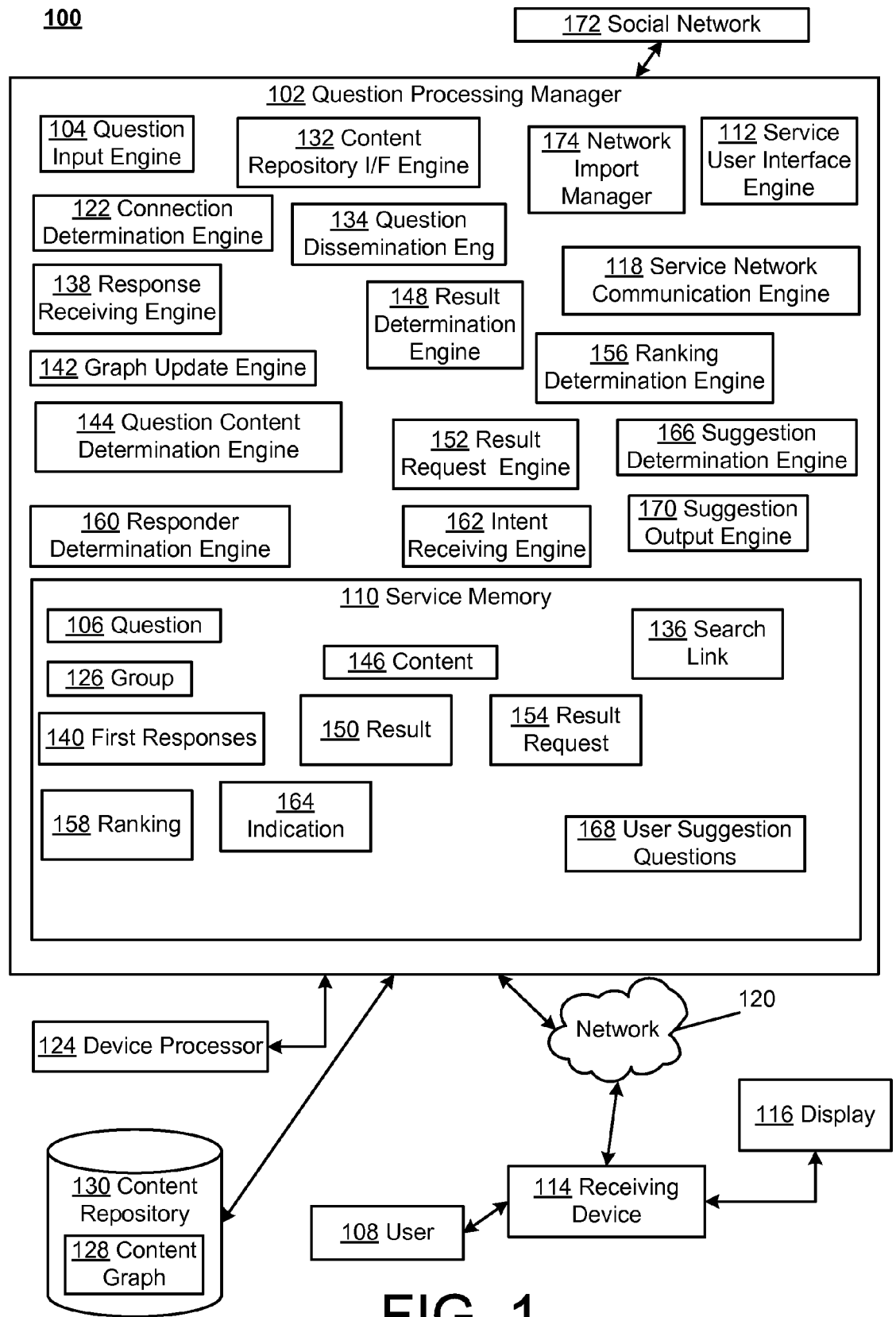
FIG. 1 is a block diagram of an example system for processing user questions.

Many users of computing devices depend on the devices to aid in the users' decision-making activities. As computing technology has advanced, so has the capability of many devices to provide large amounts of information in real-time, in a mobile environment.

Many users are also members of one or more social networking services, building their circles of friend connections on a daily basis. In such social networking environments, it is possible to restrict access to various elements of personal member information to the member and his/her friends in the system. For example, the social networking service may track the "friend" relationships (agreed to by the members) via a social graph structure. For example, a social graph may include nodes representing individual members of the service, with edges connecting the nodes representing relationships such as a "friend" relationship (e.g., node X may be connected to node Y via a "friend" edge, indicating that member X is a "friend" of member Y). Such a graph may be used by the system in deciding when access to certain information to members may be/not be permitted. Access to the "friend" information for individual members may be authorized when an individual member logs in to his/her user account in the system.

If a user of a mobile device wishes to obtain an opinion from one or more of their "friends", the user may not have time to select a list of the people they think would provide the most trusted information regarding various activities. For example, if the user is debating whether to eat lunch at a restaurant that is located a few feet from where they are currently standing, he/she may not have several minutes to key in a question on a mobile device, and then generate a list of intended recipients that may have the most relevant opinions with regard to that nearby restaurant. For example, if the user is currently standing in downtown Seattle, he/she may not want to send a request for an opinion on a Seattle-based local restaurant to an Australian "friend" residing in Perth, Australia. Thus, the user may wish to quickly obtain a list of his/her "friends" who might be able to provide trustworthy opinions on the restaurant (and not "friends" who might be bothered by messages that may seem irrelevant to them personally).

Example techniques discussed herein may provide simple user experiences for large-scale mobile social interaction. For example, a user may easily ask a binary question to his/her friends and obtain a response, for example, based on votes provided by the friends. For example, a user may obtain a response, from his/her "friends", to a question regarding whether they should see a particular movie, the response arriving in a time frame of a few minutes, or seconds.

Example techniques discussed herein may provide techniques for users to easily and quickly ask and answer questions. According to an example embodiment, questions may be suggested to the user as he/she enters a question. For example, the suggested questions may be based on the user's demographic and prior interests/questions, to predict potential future questions and minimize keystrokes for generating a question quickly.

According to an example embodiment, binary questions may request binary responses, which may provide the responder with a simple button to select for responding (e.g., the responder may not need to type any text to respond— simply select a binary response, via one keystroke or one-word verbal command). For example, the binary responses may generalize to not only meaning "yes/no", but may also indicate "been there/not", "ate that/not", or "seen that/not".

According to an example embodiment, push notifications for various questions from a user may be sent to "closer" friends of the user, or to friends who may be more likely to answer particular questions, based on an analysis of information associated with "friends" of the user. For example, a "friend" residing in Australia may not be selected as a recipient for question from a Seattle resident regarding a local Seattle restaurant (unless that "friend" is associated with a history of activities or interests in the Seattle area).

According to an example embodiment, data obtained from histories of questions/answers in a question processing system may be mined and information may be inferred, based on the questions/answers (e.g., user demographic, shopping behavior, past experiences, expertise, interests, influencers). For example, if a user asks several questions regarding artists such as Justin Bieber, as well as questions regarding female teen-level clothing, then an inference may be drawn (with regard to the user demographic) that the user may be a teen-aged female.

According to an example embodiment, a search icon may be presented with each question that allows users viewing the questions to take actions. According to an example embodiment, an analysis of an intent of a question may be used by the system to determine what actions a user may be likely to take. For example, if a user is viewing a question regarding a named restaurant, then a search icon may provide quick access to information regarding the restaurant location, the owner/proprietor, the menu, and ratings posted online or in other information sources. For example, the system may receive a question regarding the restaurant, and may determine an intent of the question as a query on the location, the quality of food, or the overall cost of meals. The determination may be based, for example, on a history of questions and other information associated with the restaurant, the owner/proprietor, the location of the restaurant, the type of food associated with the restaurant, and/or attributes associated with the asking user and/or "friends" of the asking user. The determination may be based, for example, on searches of the web and other informational sources.

As further discussed herein, FIG. 1 is a block diagram of a system 100 for processing user questions. As shown in FIG. 1, a system 100 may include a question processing manager 102. According to an example embodiment, the question processing manager 102 may be embodied via executable instructions stored on a computer-readable storage medium. For example, the executable instructions may, when executed, cause one or more data processing apparatuses to perform steps that may be associated with example techniques as discussed further herein.

As shown in FIG. 1, the question processing manager 102 may include a question input engine 104 that may be configured to receive a question 106 from a first user 108.

According to an example embodiment, the question processing manager 102 may include a service memory 110 that may store the question 106. In this context, a "memory" may include a single memory device or multiple memory devices configured to store data and/or instructions. Further, the service memory 110 may span multiple distributed storage devices.

According to an example embodiment, a service user interface engine 112 may manage communications between the user 108 and the question processing manager 102. The user 108 may be associated with a receiving device 114 that may be associated with a display 116 and other input/output devices. For example, the display 116 may be configured to communicate with the receiving device 114, via internal device bus communications, or via at least one network connection.

According to an example embodiment, the question processing manager 102 may include a service network communication engine 118 that may manage network communication between the question processing manager 102 and other entities that may communicate with the question processing manager 102 via at least one network 120. For example, the network 120 may include one or more networks such as the Internet, at least one wireless network, or at least one wired network. For example, the network 120 may include a cellular network, a radio network, or any type of network that may support transmission of data for the question processing manager 102. For example, the service network communication engine 118 may manage network communications between the question processing manager 102 and the receiving device 114. For example, the service network communication engine 118 may manage network communication between the service user interface engine 112 and the receiving device 114.

A connection determination engine 122 may be configured to determine, via a device processor 124, a first group 126 of connection users having a connection user association with the first user 108 in a content graph 128.

In this context, a "processor" may include a single processor or multiple processors configured to process instructions associated with a processing system. A processor may thus include multiple processors processing instructions in parallel and/or in a distributed manner. Although the device processor 124 is depicted as external to the question processing manager 102 in FIG. 1, one skilled in the art of data processing will appreciate that the device processor 124 may be implemented as a single component, and/or as distributed units which may be located internally or externally to the question processing manager 102, and/or any of its elements.

One skilled in the art of data processing may understand that a "graph" generally may refer to a structure that includes nodes and edges. The nodes may represent entities, and each edge may connect a pair of nodes, the edge representing a relationship between the connected pair of nodes.

In this context, a "content graph" may thus refer to a graph structure that may include nodes representing entities (e.g., persons, questions, attributes) and edges connecting pairs of nodes, the edges representing relationships between respective connected pairs of nodes. For example, a content graph question node may represent a question, a user node may represent a user of a system, and an edge connecting the question node and the user node may represent an action indicating the user asking the question. Further a second user node may be connected to the question node via an edge that represents an action indicating the user providing an answer to the question. According to an example embodiment, cumulative results for the question may be stored in association with the question node, and/or individual answers may be stored in association with user nodes associated with respective responders to the question. According to an example embodiment, an edge may connect the user node and the second node indicating a "friend" relationship between the connected nodes (and the respective users).

According to an example embodiment, a type of connection may be stored with the edges. For example, if a connection for a particular graph is determined via information from an external source (e.g., a social network source), then information identifying the source of the connection identification may be stored in association with the edge indicating the connection. For example, if a user identifies a "friend" then an edge connecting the user node with a node representing the friend may indicate that the user provided the indication of the "friend" relationship.

According to an example embodiment, an answer to a question may also be stored in association with an edge connecting the question node to the node associated with the answering party. According to an example embodiment, attributes associated with a connection may be stored in association with edges connecting nodes in the content graph 128.

According to an example embodiment, the content graph 128 may be stored in a content repository 130, which may be located internally or externally to the question processing manager 102. According to an example embodiment, a content repository interface engine 132 may manage communications between the content repository 130 and other elements of the question processing manager 102.

A question dissemination engine 134 may be configured to initiate a transmission of the question 106 and a search link 136 to each of at least a portion of the connection users included in the first group 126.

A response receiving engine 138 may be configured to receive one or more first responses 140 from one or more of the connection users included in the at least a portion of the connection users.

A graph update engine 142 may be configured to initiate a first update to the content graph 128, the first update including an addition of a first node associated with the received question 106 and a first link associating the first user 108 with the first node, the first link indicating an action of asking the question, and initiate a second update to the content graph, the second update including an addition of a second link associating one of the connection users associated with one of the received first responses 140, with the first node, the first link indicating an action of answering the question.

According to an example embodiment, a question content determination engine 144 may be configured to determine a content 146 associated with the question 106 and to determine the search link 136 based on determining web sites associated with information associated with the content 146 associated with the question 106. For example, the question content determination engine 144 may determine the content 146 associated with the question 106 and may infer an intent associated with the question. For example, if a question relates to a restaurant or movie, then an inference may be made that an intent of the question may involve a query regarding whether the querying user should eat at the restaurant, or pay for tickets to watch the movie. Other example intents that may be inferred from such questions may include queries regarding the quality/age-appropriateness of the food or movie, the location (e.g., navigational instructions), or the ambience of an establishment/surrounding neighborhood.

For example, a task associated with a question "Have you been to Space Needle?" might include obtaining navigational directions to the Space Needle. Other actions may include "buy movie ticket", "shop for shoes", or "make dinner reservations". The search link 136 may thus include information relating to completing such inferred tasks. For example, a task indicated as "make dinner reservations" may include a link to an online restaurant table reservation system, and may provide available times to the first user 108 (or may provide a number to call, or may offer to auto-dial the number, if tables are indicated as unavailable).

For example, the search link 136 may include one-click access to a predetermined search of a search engine regarding keywords (or keywords inferred by the question content determination engine 144) associated with the question. For example, the search link 136 may include one-click access to information obtained by the question processing manager 102 that the question content determination engine 144 may determine based on accessing the content graph 128, or a combination of search engine results and information based on the content graph 128.

Thus, if a person viewing the question desires more information to aid in making his/her voting decision, or if the person viewing the question desires more information regarding possible intents of the question, the search link 136 may provide quick access to such information (e.g., without keying in search terms).

According to an example embodiment, the connection determination engine 122 may be configured to determine the first group 126 of connection users based on one or more friend connections associated with the first user 108 in a network or graph.

According to an example embodiment, a result determination engine 148 may be configured to determine a first result 150 based on the received one or more first responses 140. According to an example embodiment, the graph update engine 142 may be configured to initiate storage of the first result 150 in the first node.

According to an example embodiment, a result request engine 152 may be configured to receive a first result request 154 from the first user 108. According to an example embodiment, the result determination engine 148 may be configured to initiate a transmission of the first result 150 to the first user 108, based on a traversal of the content graph 128.

According to an example embodiment, the result request engine 152 may be configured to receive the first result request 154 from one of the connection users included in the first group 126. According to an example embodiment, the result determination engine 152 may be configured to initiate a transmission of the first result 150 to the one of the connection users included in the first group 126.

According to an example embodiment, the question 106 may include a query associated with a binary condition, and the one or more first responses 140 may each include one of two binary response values.

According to an example embodiment, the question 106 may include a query associated with one of a yes/no condition or an up/down vote condition, According to an example embodiment, the one or more first responses 140 may each include one of a yes/no value or an up/down vote value.

According to an example embodiment, the second update may include an addition of a third node associated with the first response, a third link associating the third node with the first node, the third link indicating an answer relationship between the question and the first response.

According to an example embodiment, a ranking determination engine 156 may be configured to determine a ranking 158 of the connection users included in the first group 126 based on comparing attributes associated with each of the connection users included in the first group 126 and attributes associated with content 146 of the question 106.

According to an example embodiment, a responder determination engine 160 may be configured to determine the at least a portion of the first group 126 of connection users based on the determined ranking 158.

According to an example embodiment, the ranking determination engine 156 may be configured to determine the ranking 158 based on one or more of location information associated with the connection users, a connection user preference associated with the first user, location information associated with the first user 108, history information associated with the connection users, or history information associated with the first user 108.

According to an example embodiment, an intent receiving engine 162 may be configured to receive an indication 164 from the first user 108 of an intent to generate a user question. For example, the user 108 may request a browser display of a user interface for receiving user questions (e.g., by activating an application that is configured to receive the user questions). The intent receiving engine 162 may thus receive an indication that the first user 108 is requesting a display or interactive application for providing his/her question.

According to an example embodiment, a suggestion determination engine 166 may be configured to determine one or more user suggestion questions 168 based on accessing a first user node in the content graph, the first user node associated with the first user 108, based on one or more of a history of questions associated with the first user 108, one or more attributes associated with the first user 108, or a partial query received from the first user 108. For example, the suggestion determination engine 166 may determine that the first user 108 is associated with a history of asking his/her friends their opinions regarding current movies, and may further determine a current location associated with the first user 108 based on location information that may be provided with a notification of an activation of a user device application associated with the question processing manager 102. For example, the suggestion determination engine 166 may infer questions, based on the history, a current time/date, and current location of the first user 108, that the first user 108 is likely to ask for opinions regarding a movie currently running at a cinema near a current location of the first user 108.

For example, the current location of the first user 108 may be obtained from the first user 108 or from a device associated with the first user 108. For example, computing devices associated with users may include Global Positioning System (GPS) functionality that may provide geographic coordinates for determining locations. As another example, the first user 108 may provide location information, or location information may be determined based on a port address on a network. The location information may also be determined from an analysis of wireless station locations if the computing device associated with the first user 108 is utilizing wireless communications.

According to an example embodiment, a suggestion output engine 170 may be configured to initiate a transmission of the one or more user suggestion questions 168 to a device associated with the first user 108. For example, based on a history of types of movies (e.g., drama, comedy, action thriller, romantic, teen theme, particular actor/actress star) in which the first user 108 may have indicated interests (e.g., via questions asked/answered by the first user 108 in the past), the suggestion determination engine 166 may determine particular movies currently showing at a cinema nearby for inclusion in the suggestion questions 168, including those scheduled to start in the next few minutes after the transmission of the question 106. Thus, the first user 108 may change his/her initial intended question from "Should I see movie X" to "Should I see movie Y", based on information provided by the suggestion questions 168 to the first user 108. As another example, the suggestion questions 168 may include suggestions of activities that may appear more desirable to the first user 108 than his/her original plan. The first user 108 may thus select his/her preferred question from the user suggestion questions 168 and receive swift feedback from his/her "friends".

According to an example embodiment, the graph update engine 142 may be configured to initiate a third update to the content graph 128, the third update including an update to a first user node in the content graph 128, the first user node associated with the first user, the update including updating one or more of demographic information associated with the first user 108, location information associated with the first user 108, preference information associated with the first user 108, or behavior information associated with the first user 108.

According to an example embodiment, a group of connection users having friend connections to the user 108 may be determined based on accessing a social network 172. For example, the user 108 may log in to a service associated with the system 100 by logging in to the social network 172 (e.g., a posting social network, an instant messaging system).

According to an example embodiment, a network import manager 174 may be configured to access systems (e.g., the social network 172) to determine content and/or connections associated with users having nodes in the content graph 128 (e.g., the user 108), and to update the content graph 128 based on information determined via the access. For example, if the user 108 activates an application related to the question processing manager 102, such that access to the social network 172 is enabled (e.g., via a login by the user 108), the network import manager 174 may access the information that may be available to the user 108 via the social network 172 to update the content graph 128 over time. For example, the network import manager 174 may determine updates to the information in the social network 172 that has been updated by activities related to the user 108, or to other social network users connected to the user 108 in the social network 172.

For example, the network import manager 174 may determine both social connections and content indicated in the social network 172, and may update the content graph 128 to indicate either/both the social connections and/or the content associated with the social network 172 that may be accessible via access permissions associated with the user 108. For example, if the user 108 is connected to a "friend" in the social network 172, but the "friend" is not currently included in the content graph 128 (e.g., the "friend" is not a registered user of the content graph 128), then the network import manager 174 may obtain information regarding the "friend" from the social network 172, and may add a new node associated with the "friend" in the content graph 128. Content associated with the "friend" in the social network 172 (that is accessible to the user 108) may also be added to the content graph 128. According to an example embodiment, metadata indicating the source of the update data may be stored in the content graph 128.

For example, the network import manager 174 may determine other information that may be available via other sources (news pages on the Internet, blogs, searches on keywords of interest), and may periodically update the content/connection information stored in the content graph 128.

According to an example embodiment, the question processing manager 102 may be embodied via executable instructions that may be stored on a computer-readable storage medium, as discussed below. According to an example embodiment, the computer-readable storage medium may include any number of storage devices, and any number of storage media types, including distributed devices.

Figure 2:
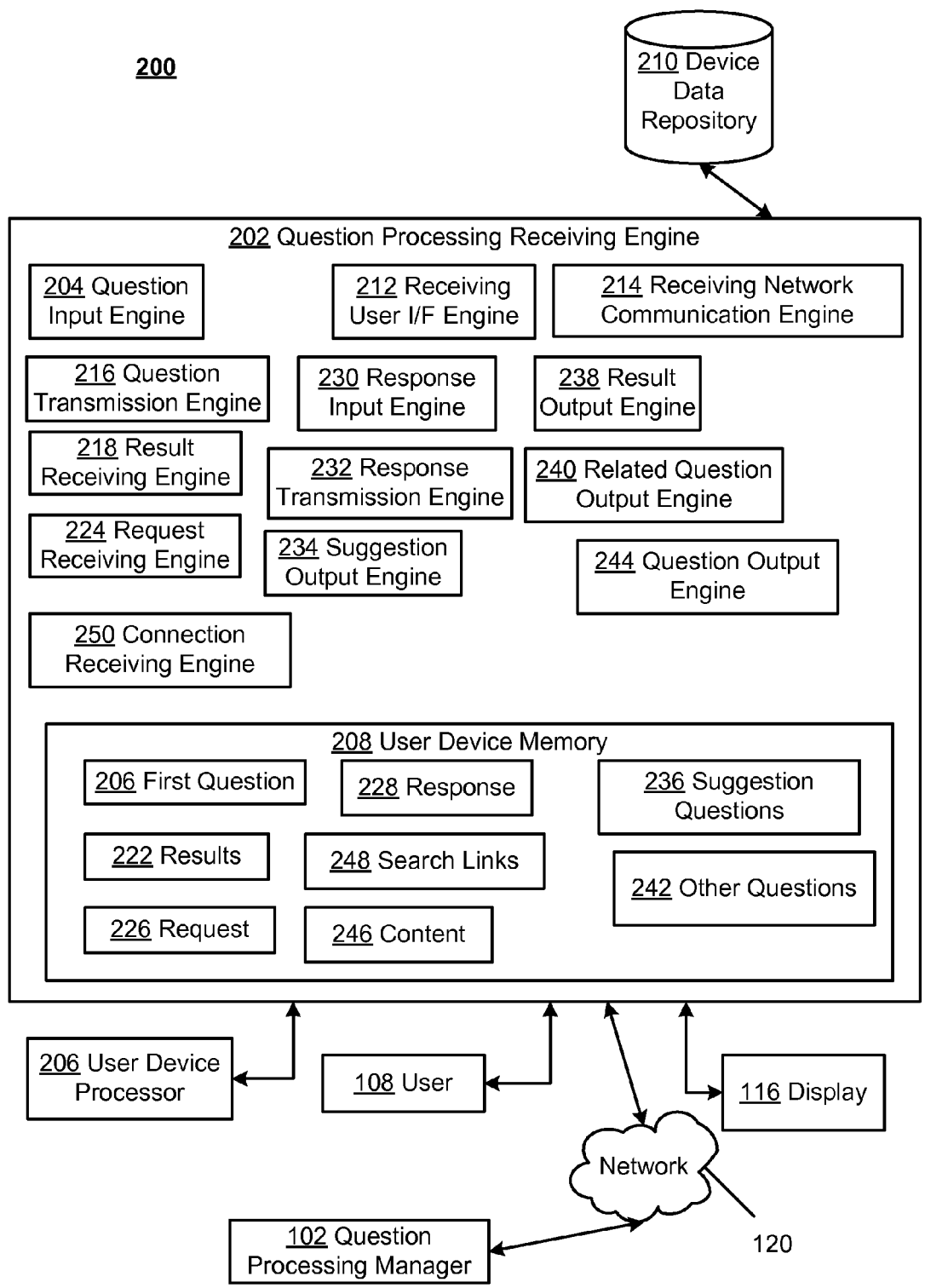
FIG. 2 is a block diagram of an example system for processing user questions.

FIG. 2 is a block diagram of an example system for managing user questions. For example, the system of FIG. 2 may include the receiving device 114 discussed above with regard to FIG. 1. As shown in FIG. 2, a system 200 may include a question processing receiving engine 202 that may include a question input engine 204 that may be configured to receive a first question 206 from a first device user 108, the first question 206 associated with a request for responses to the first question 206 from a group of connection users associated with the first device user 108 via one or more friend connections to the first user 108 in a content network. For example, the content network may include a content network that includes the content graph 128.

For example, the first user 108 may provide an input indicating the first question 206 via an input device associated with the question processing receiving engine 202 (e.g., a keyboard, touchpad, touchscreen, mouse click, audio input device for receiving voice input), the request input received by the question input engine 204.

According to an example embodiment, the question processing receiving engine 202 may be embodied via executable instructions stored on a computer-readable storage medium. For example, the executable instructions may, when executed, cause one or more data processing apparatuses to perform steps that may be associated with example techniques as discussed further herein.

According to an example embodiment, a user device memory 208 may be configured to store the first question 206. According to an example embodiment, a device data repository 210 may be configured to persistently store data associated with the question processing receiving engine 202. For example, the device data repository 210 may be located on a disk drive or other storage medium associated with the question processing receiving engine 202.

According to an example embodiment, a receiving user interface engine 212 may manage communications between the user 108 and the question processing receiving engine 202. For example, the display 116 may communicate with the question processing receiving engine 202, via internal device bus communications, or via at least one network connection.

According to an example embodiment, the question processing receiving engine 202 may include a receiving network communication engine 214 that may manage network communication between the question processing receiving engine 202 and other entities that may communicate with the question processing receiving engine 202 via at least one network 120. For example, the at least one network 120 may include at least one of the Internet, at least one wireless network, or at least one wired network. For example, the at least one network 120 may include a cellular network, a radio network, or any type of network that may support transmission data for the question processing receiving engine 202. For example, the receiving network communication engine 214 may manage network communications between the question processing receiving engine 202 and the question processing manager 102. For example, the receiving network communication engine 214 may manage network communication between the receiving user interface engine 212 and the question processing manager 102.

A question transmission engine 216 may be configured to initiate a transmission of the first question 206 to a question processing service associated with the content network. A result receiving engine 218 may be configured to receive an indication of one or more results 222 associated with the first question 206, the one or more results 222 indicating responses associated with one or more responders included in the group of connection users.

A request receiving engine 224 may be configured to receive a request 226 for a response 228 to a second question, the second question associated with a requesting connection user that is associated with the first device user via a friend connection to the first user in the content network, the request 226 for the response including an indicator of one or more search links to descriptive information describing content included in the second question, the request 226 for the response associated with a request for responses to the second question from a group of connection users associated with the requesting connection user via one or more friend connections to the requesting connection user in the content network.

A response input engine 230 may be configured to receive the response 228 to the second question from the first device user 108. A response transmission engine 232 may be configured to initiate a transmission of the response 228 to the second question to the query processing service.

According to an example embodiment, a suggestion output engine 234 may be configured to initiate an output to the first device user 108 indicating one or more suggestion questions 236, based on one or more of one or more attributes associated with the first device user 108, a location associated with the first device user 108, a current time, one or more current events, or one or more attributes associated with one or more of the connection users.

According to an example embodiment, a result output engine 238 may be configured to initiate an output to the first device user 108 indicating the one or more results 222 associated with the first question 206.

According to an example embodiment, a related question output engine 240 may be configured to initiate an output to the first device user 108 indicating other questions 242 associated with one or more of the connection users.

According to an example embodiment, a question output engine 244 may be configured to initiate an output to the first device user 108 indicating the content 246 of the second question and one or more search links 248 to descriptive information describing the content 246 included in the second question.

According to an example embodiment, a connection receiving engine 250 may be configured to receive an indication of one or more first network users associated with a first network, the first network users associated with the first device user 108 based on one or more friend connections to the first device user 108 in the first network.

Figure 3A:
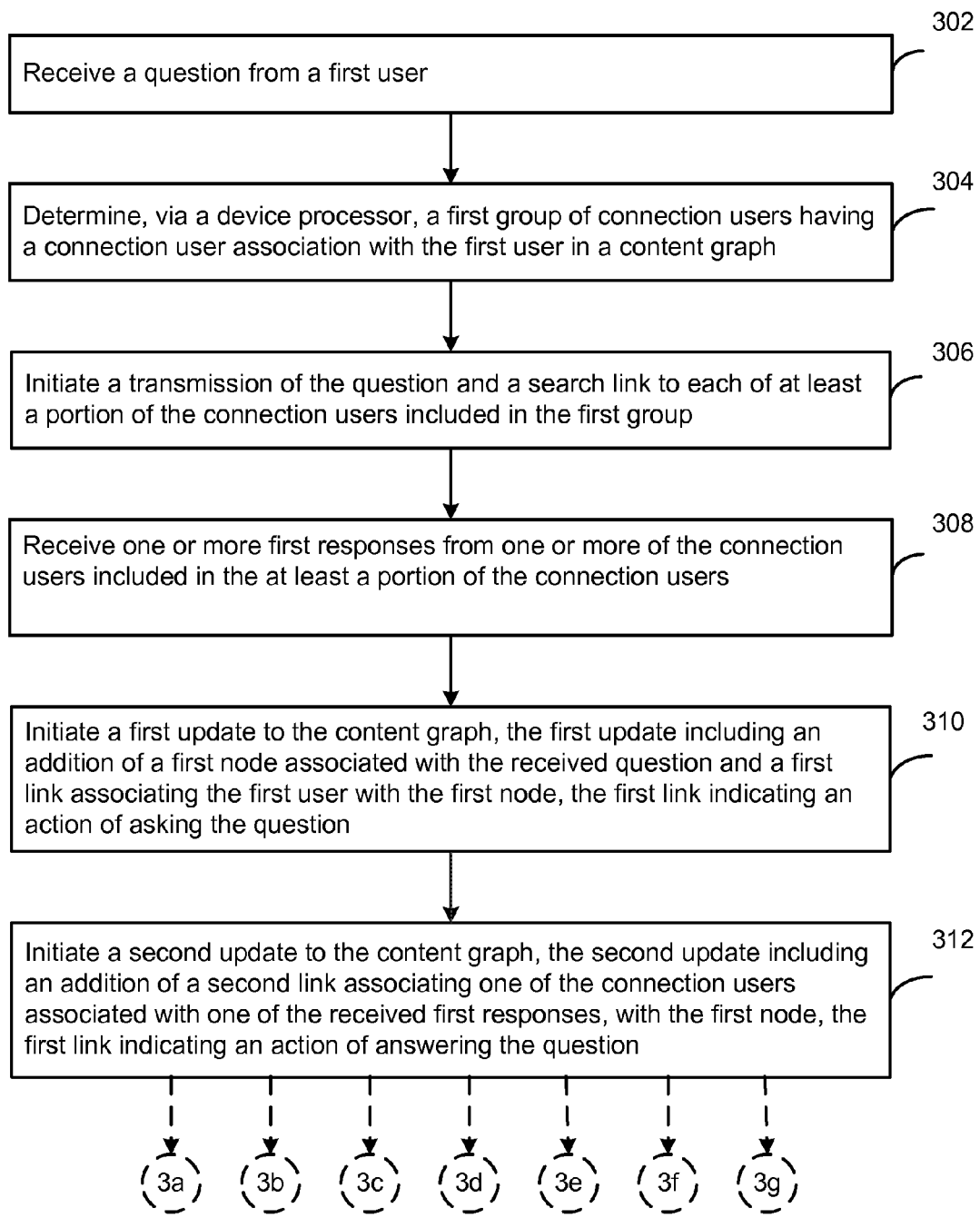

FIGS. 3A-3D are a flowchart illustrating example operations of the system of FIG. 1, according to example embodiments. In the example of FIG. 3A, a question may be received from a first user (302). For example, the question input engine 104 may receive the question 106 from the first user 108, as discussed above.

A first group of connection users having a connection user association with the first user in a content graph may be determined (304). For example, the connection determination engine 122 may determine, via the device processor 124, the first group 126 of connection users having a connection user association with the first user 108 in the content graph 128, as discussed above.

A transmission of the question and a search link to each of at least a portion of the connection users included in the first group may be initiated (306). For example, the question dissemination engine 134 may initiate a transmission of the question 106 and the search link 136 to each of at least a portion of the connection users included in the first group 126, as discussed above.

One or more first responses may be received from one or more of the connection users included in the at least a portion of the connection users (308). For example, the response receiving engine 138 may receive one or more first responses 140 from one or more of the connection users included in the at least a portion of the connection users, as discussed above.

A first update to the content graph may be initiated, the first update including an addition of a first node associated with the received question and a first link associating the first user with the first node, the first link indicating an action of asking the question (310). A second update to the content graph may be initiated, the second update including an addition of a second link associating one of the connection users associated with one of the received first responses, with the first node, the first link indicating an action of answering the question (312). For example, the graph update engine 142 may initiate a first update to the content graph 128, the first update including an addition of a first node associated with the received question 106 and a first link associating the first user 108 with the first node, the first link indicating an action of asking the question, and initiate a second update to the content graph, the second update including an addition of a second link associating one of the connection users associated with one of the received first responses 140, with the first node, the first link indicating an action of answering the question, as discussed above.

According to an example embodiment, a content associated with the question may be determined, and the search link may be determined based on determining web sites associated with information associated with the content associated with the question (314). For example, the question content determination engine 144 may determine a content 146 associated with the question 106 and to determine the search link 136 based on determining web sites associated with information associated with the content 146 associated with the question 106, as discussed above.

According to an example embodiment, the first group of connection users may be determined based on one or more friend connections associated with the first user in a network or graph (316). For example, the connection determination engine 122 may determine the first group 126 of connection users based on one or more friend connections associated with the first user 108 in a network or graph, as discussed above. According to an example embodiment, the search link may include a null value.

According to an example embodiment, the question may include a query associated with a binary condition. According to an example embodiment, the one or more first responses each include one of two binary response values.

According to an example embodiment, the question may include a query associated with one of a yes/no condition or an up/down vote condition, and the one or more first responses may each include one of a yes/no value or an up/down vote value (318).

According to an example embodiment, the second update may include an addition of a third node associated with the first response, a third link associating the third node with the first node, the third link indicating an answer relationship between the question and the first response (320).

According to an example embodiment, a first result may be determined based on the received one or more first responses (322). For example, the result determination engine 148 may determine the first result 150 based on the received one or more first responses 140, as discussed above.

According to an example embodiment, storage of the first result in the first node may be initiated (324). For example, the graph update engine 142 may initiate storage of the first result 150 in the first node, as discussed above.

According to an example embodiment, a first result request from the first user may be received (326). For example, the result request engine 152 may receive the first result request 154 from one of the connection users included in the first group 126, as discussed above.

According to an example embodiment, a transmission of the first result to the first user may be initiated, based on a traversal of the content graph (328). For example, the result determination engine 148 may initiate a transmission of the first result 150 to the first user 108, based on a traversal of the content graph 128, as discussed above.

According to an example embodiment, a first result request from one of the connection users included in the first group may be received (330). For example, the result request engine 152 may receive the first result request 154 from one of the connection users included in the first group 126, as discussed above.

According to an example embodiment, a transmission of the first result to the one of the connection users included in the first group may be initiated (332). For example, the result determination engine 152 may be initiate a transmission of the first result 150 to the one of the connection users included in the first group 126, as discussed above.

According to an example embodiment, a third update to the content graph may be initiated, the third update including an update to a first user node in the content graph, the first user node associated with the first user, the update including updating one or more of demographic information associated with the first user, location information associated with the first user, preference information associated with the first user, or behavior information associated with the first user (334). For example, the graph update engine 142 may initiate a third update to the content graph 128, the third update including an update to a first user node in the content graph 128, the first user node associated with the first user, the update including updating one or more of demographic information associated with the first user 108, location information associated with the first user 108, preference information associated with the first user 108, or behavior information associated with the first user 108, as discussed above.

According to an example embodiment, a ranking of the connection users included in the first group may be determined based on comparing attributes associated with each of the connection users included in the first group and attributes associated with content of the question (336). For example, the ranking determination engine 156 may determine a ranking 158 of the connection users included in the first group 126 based on comparing attributes associated with each of the connection users included in the first group 126 and attributes associated with content 146 of the question 106, as discussed above.

According to an example embodiment, the at least a portion of the first group of connection users may be determined based on the determined ranking (338). For example, the responder determination engine 160 may determine the at least a portion of the first group 126 of connection users based on the determined ranking 158, as discussed above.

According to an example embodiment, the ranking may be determined based on one or more of location information associated with the connection users, a connection user preference associated with the first user, location information associated with the first user, history information associated with the connection users, or history information associated with the first user (340). For example, the ranking determination engine 156 may determine the ranking 158 based on one or more of location information associated with the connection users, a connection user preference associated with the first user, location information associated with the first user 108, history information associated with the connection users, or history information associated with the first user 108, as discussed above.

According to an example embodiment, an indication from the first user of an intent to generate a user question may be received (342). For example, the intent receiving engine 162 may receive an indication 164 from the first user 108 of an intent to generate a user question, as discussed above.

According to an example embodiment, one or more user suggestion questions may be determined based on accessing a first user node in the content graph, the first user node associated with the first user, based on one or more of a history of questions associated with the first user, one or more attributes associated with the first user, or a partial query received from the first user (344). For example, the suggestion determination engine 166 may determine one or more user suggestion questions 168 based on accessing a first user node in the content graph, the first user node associated with the first user 108, based on one or more of a history of questions associated with the first user 108, one or more attributes associated with the first user 108, or a partial query received from the first user 108, as discussed above.

Figure 4A:
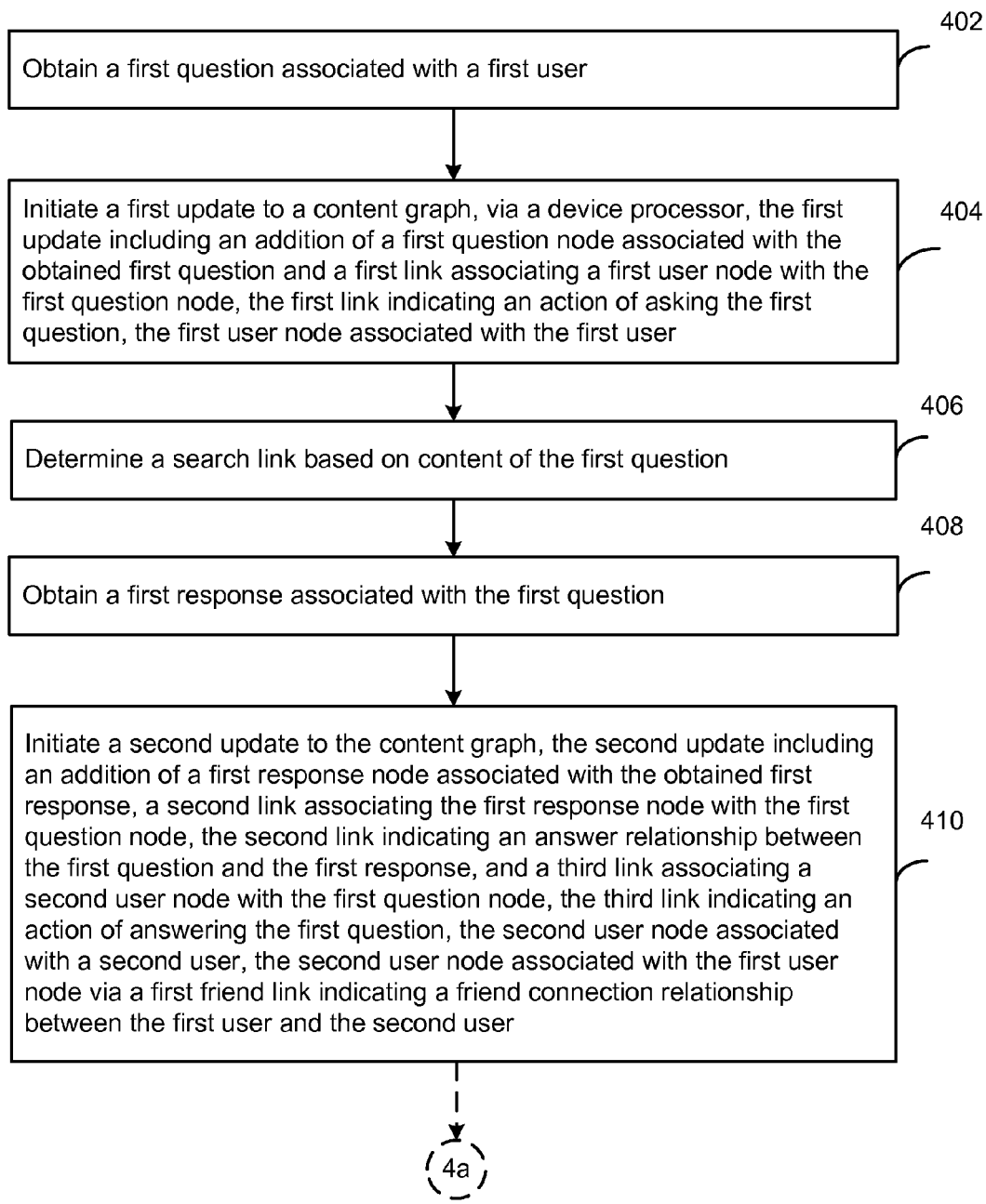
FIGS. 4A-4C are a flowchart illustrating example operations of the system of FIG. 1.
Figure 4B:
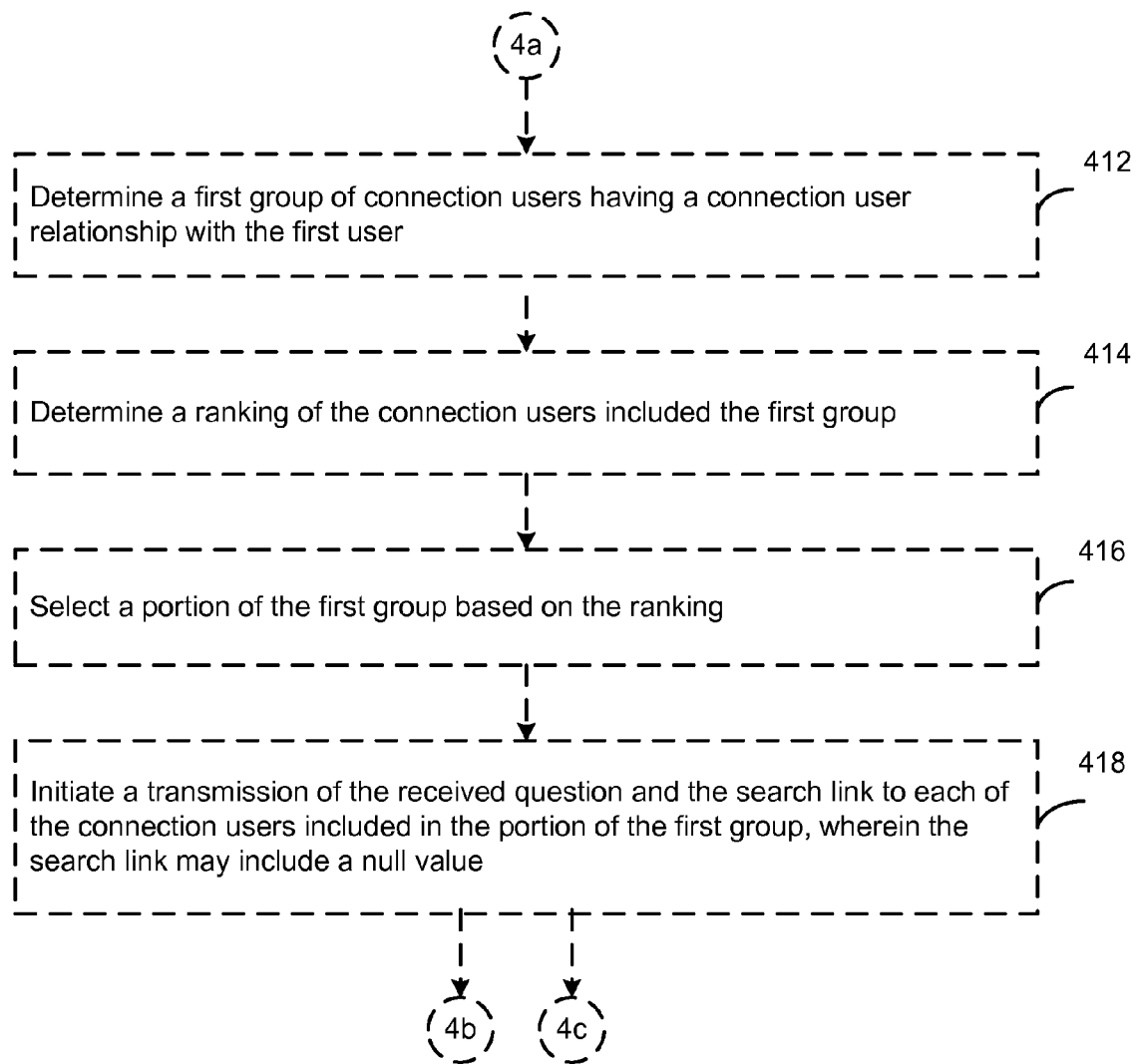
Figure 4C:
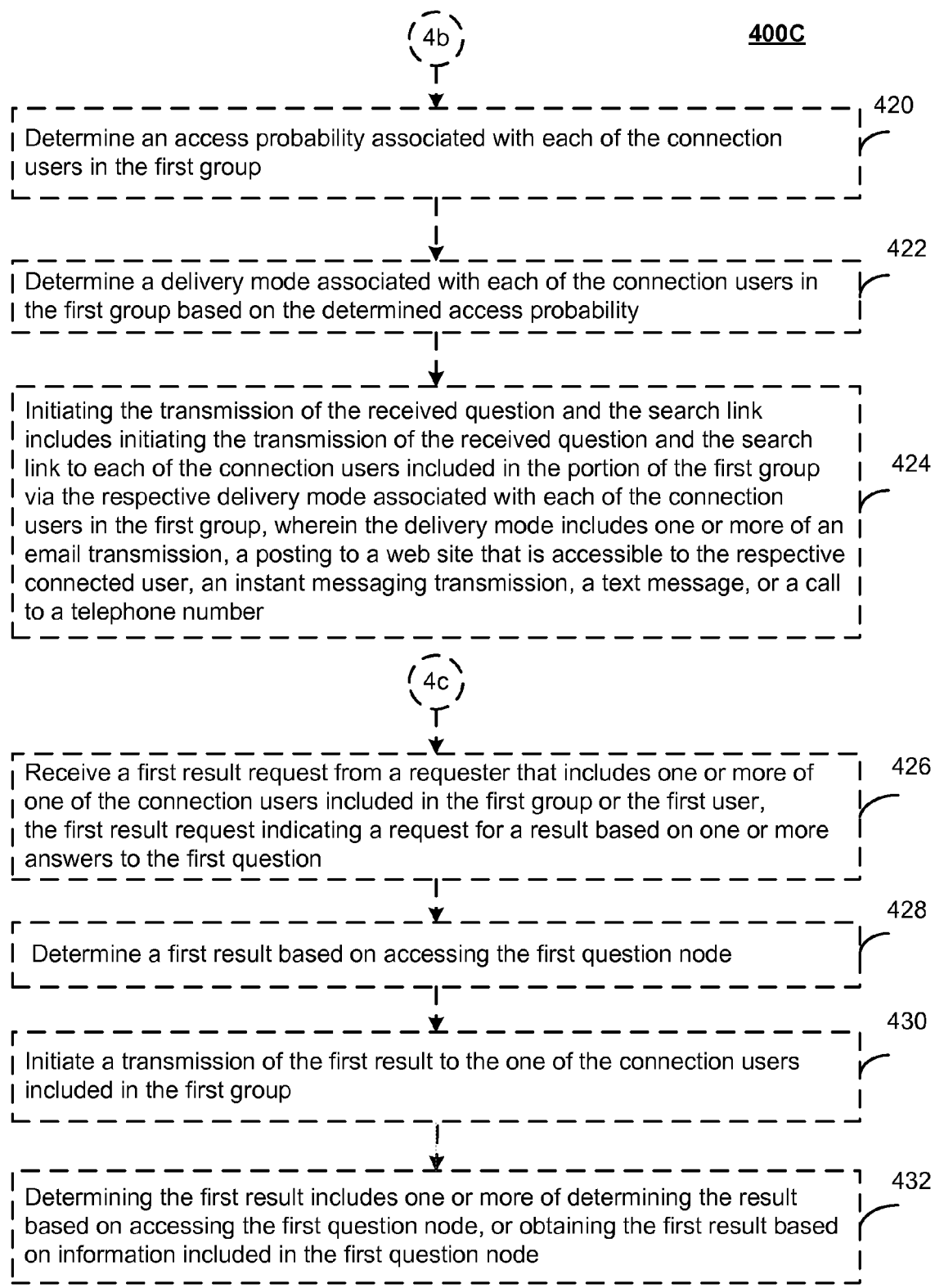

According to an example embodiment, a transmission of the one or more user suggestion questions to a device associated with the first user may be initiated (346). For example, the suggestion output engine 170 may initiate a transmission of the one or more user suggestion questions 168 to a device associated with the first user 108, as discussed above FIGS. 4A-4B are a flowchart illustrating example operations of the system of FIG. 1, according to example embodiments. In the example of FIG. 4A, a first question associated with a first user may be obtained (402). For example, the question input engine 104 may receive a question 106 from the first user 108, as discussed above.

A first update to a content graph may be initiated, via a device processor, the first update including an addition of a first question node associated with the obtained first question and a first link associating a first user node with the first question node, the first link indicating an action of asking the first question, the first user node associated with the first user (404). For example, the graph update engine 142 may initiate a first update to the content graph 128, as discussed above.

A search link may be determined based on content of the first question (406). For example, the question content determination engine 144 may determine a content 146 associated with the question 106 and determine the search link 136 based on determining web sites associated with information associated with the content 146 associated with the question 106, as discussed above.

A first response associated with the first question may be obtained (408). For example, the response receiving engine 138 may receive one or more first responses 140, as discussed above.

A second update to the content graph may be initiated, the second update including an addition of a first response node associated with the obtained first response, a second link associating the first response node with the first question node, the second link indicating an answer relationship between the first question and the first response, and a third link associating a second user node with the first question node, the third link indicating an action of answering the first question, the second user node associated with a second user, the second user node associated with the first user node via a first friend link indicating a friend connection relationship between the first user and the second user (410). For example, the graph update engine 142 may initiate updates to the content graph 128, as discussed above.

According to an example embodiment, a first group of connection users having a connection user relationship with the first user may be determined (412). For example, the connection determination engine 122 may determine the first group 126 of connection users based on one or more connections associated with the first user 108 in a network or graph, as discussed above.

According to an example embodiment, a ranking of the connection users included the first group may be determined (414). For example, the ranking determination engine 156 may determine a ranking 158 of the connection users included in the first group 126, as discussed above.

According to an example embodiment, a portion of the first group may be selected based on the ranking (416). For example, the responder determination engine 160 may determine the at least a portion of the first group 126 of connection users based on the determined ranking 158, as discussed above.

According to an example embodiment, a transmission of the received question and the search link to each of the connection users included in the portion of the first group may be initiated (418). For example, the question dissemination engine 134 may initiate a transmission of the question 106 and a search link 136 to each of at least a portion of the connection users included in the first group 126, as discussed above. According to an example embodiment, the search link may include a null value.

According to an example embodiment, an access probability associated with each of the connection users in the first group may be determined (420). According to an example embodiment, a delivery mode associated with each of the connection users in the first group may be determined based on the determined access probability (422).

According to an example embodiment, initiating the transmission of the received question and the search link may include initiating the transmission of the received question and the search link to each of the connection users included in the portion of the first group via the respective delivery mode associated with each of the connection users in the first group, wherein the delivery mode may include one or more of an email transmission, a posting to a web site that is accessible to the respective connected user, an instant messaging transmission, a text message, or a call to a telephone number (424).

According to an example embodiment, a first result request from a requester that includes one or more of one of the connection users included in the first group or the first user may be received, the first result request indicating a request for a result based on one or more answers to the first question (426). For example, the result request engine 152 may receive result requests, as discussed above.

According to an example embodiment, a first result may be determined based on accessing the first question node (428). According to an example embodiment, a transmission of the first result to the one of the connection users included in the first group may be initiated (430). For example, the result determination engine 148 may to initiate a transmission of the first result 150 to the first user 108, based on a traversal of the content graph 128, as discussed above.

According to an example embodiment, determining the first result may include one or more of determining the result based on accessing the first question node, or obtaining the first result based on information included in the first question node (432). For example, the first result may be obtained by accessing the first question node and following links indicating answers to the first question. For example, the first result may be obtained by retrieving information included in the first question node, if cumulative responses are stored in association with the first question node (e.g., a count of "thumbs up" and a count of "thumbs down" responses).

Figure 5A:
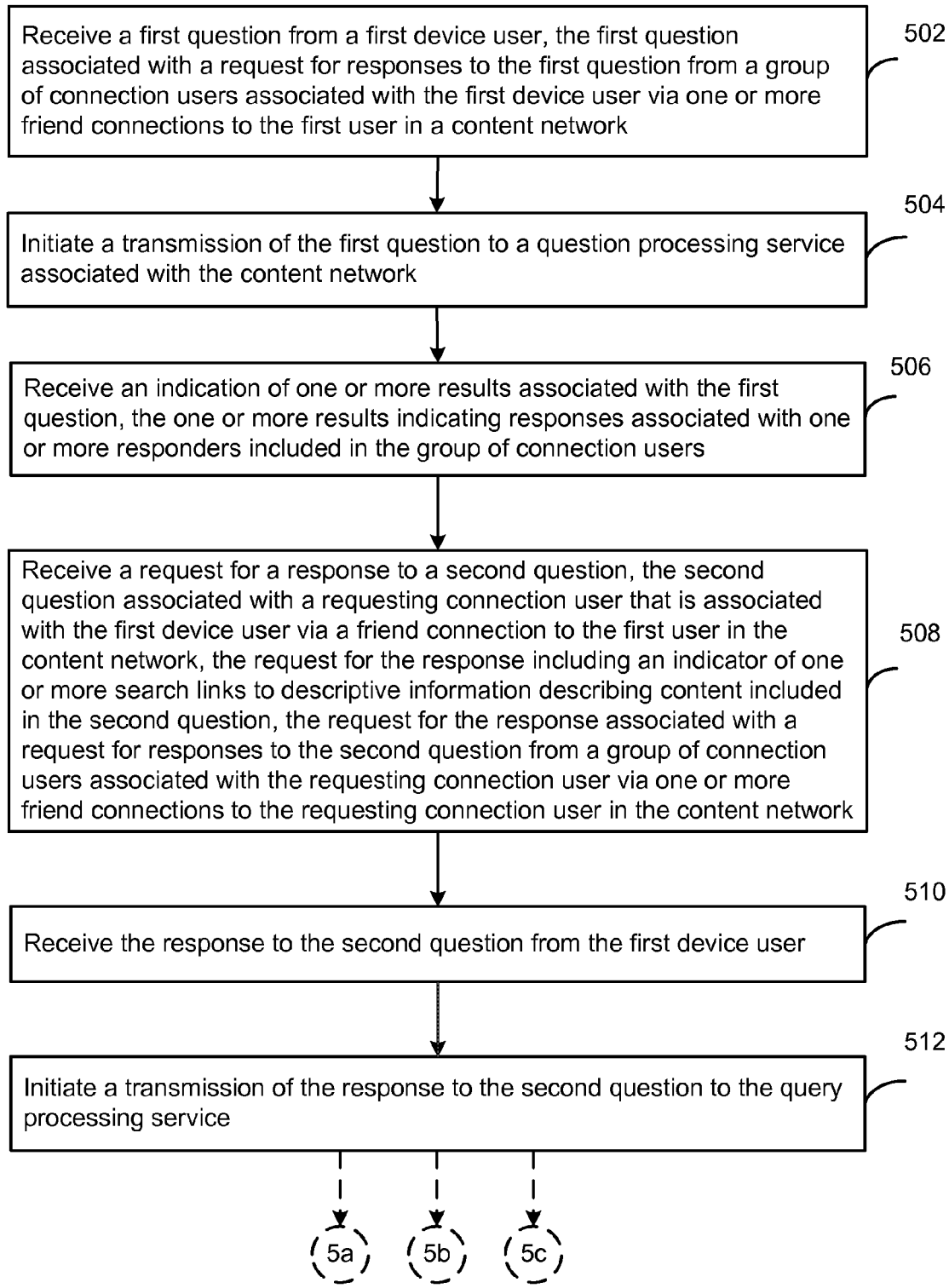
FIGS. 5A-5B are a flowchart illustrating example operations of the system of FIG. 2.
Figure 5B:
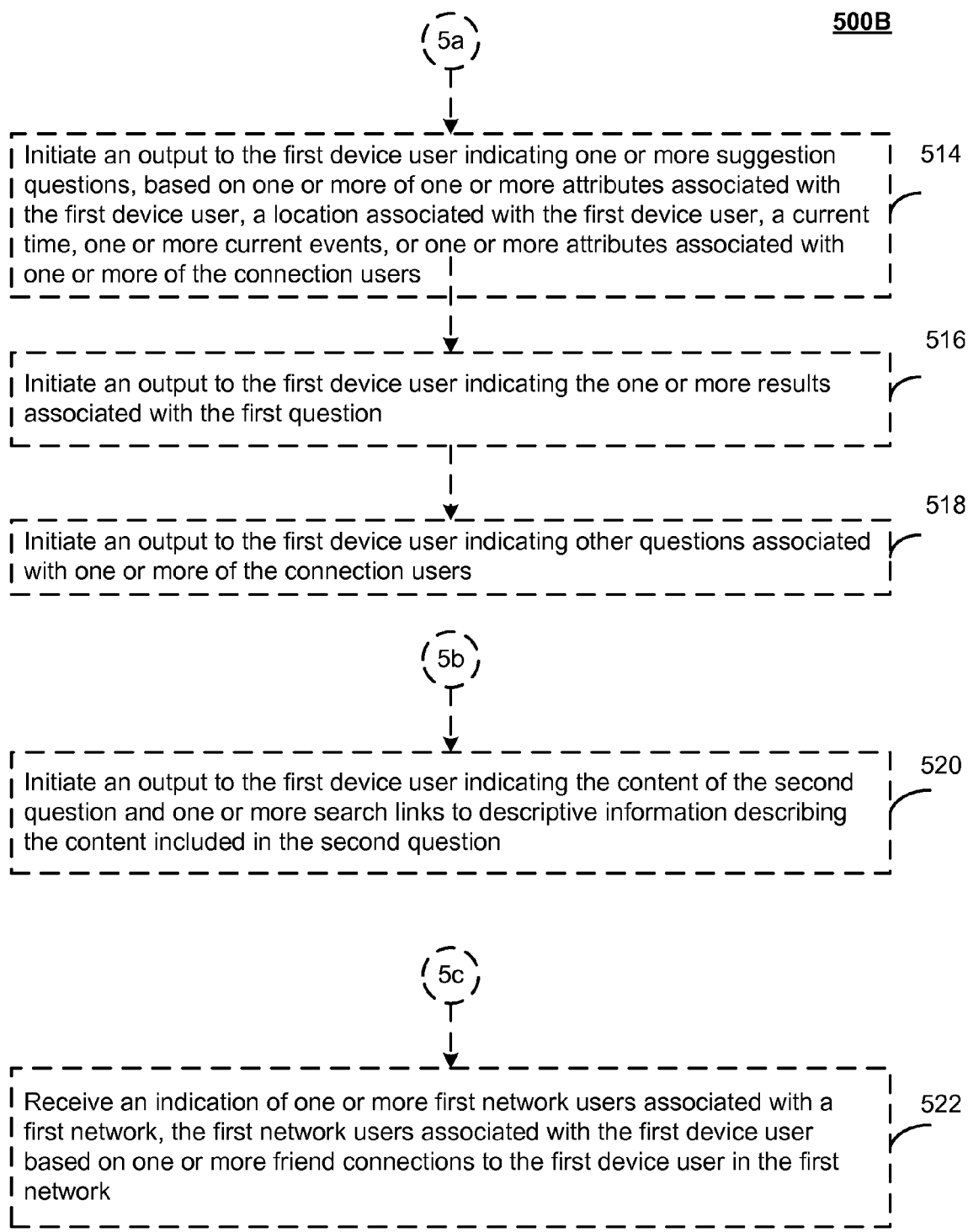

FIGS. 5A-5B are a flowchart illustrating example operations of the system of FIG. 2, according to example embodiments. In the example of FIG. 5A, a first question may be received from a first device user, the first question associated with a request for responses to the first question from a group of connection users associated with the first device user via one or more friend connections to the first user in a content network (502). For example, the question input engine 204 may receive the first question 206 from the first device user 108, the first question 206 associated with a request for responses to the first question 206 from a group of connection users associated with the first device user 108 via one or more friend connections to the first user 108 in a content network, as discussed above.

A transmission of the first question to a question processing service associated with the content network may be initiated (504). For example, the question transmission engine 216 may initiate a transmission of the first question 206 to a question processing service associated with the content network, as discussed above.

An indication of one or more results associated with the first question may be received, the one or more results indicating responses associated with one or more responders included in the group of connection users (506). For example, the result receiving engine 218 may receive the indication of one or more results 222 associated with the first question 206, the one or more results 222 indicating responses associated with one or more responders included in the group of connection users, as discussed above.

A request for a response to a second question may be received, the second question associated with a requesting connection user that is associated with the first device user via a friend connection to the first user in the content network, the request for the response including an indicator of one or more search links to descriptive information describing content included in the second question, the request for the response associated with a request for responses to the second question from a group of connection users associated with the requesting connection user via one or more friend connections to the requesting connection user in the content network (508). For example, the request receiving engine 224 may receive a request 226 for a response 228 to a second question, the second question associated with a requesting connection user that is associated with the first device user via a friend connection to the first user in the content network, the request 226 for the response including an indicator of one or more search links to descriptive information describing content included in the second question, the request 226 for the response associated with a request for responses to the second question from a group of connection users associated with the requesting connection user via one or more friend connections to the requesting connection user in the content network, as discussed above.

The response to the second question from the first device user may be received (510). For example, the response input engine 230 may receive the response 228 to the second question from the first device user 108, as discussed above.

A transmission of the response to the second question to the query processing service may be initiated (512). For example, the response transmission engine 232 may initiate a transmission of the response 228 to the second question to the query processing service, as discussed above.

According to an example embodiment, an output to the first device user indicating one or more suggestion questions may be initiated, based on one or more of one or more attributes associated with the first device user, a location associated with the first device user, a current time, one or more current events, or one or more attributes associated with one or more of the connection users (514). For example, the suggestion output engine 234 may initiate an output to the first device user 108 indicating one or more suggestion questions 236, based on one or more of one or more attributes associated with the first device user 108, a location associated with the first device user 108, a current time, one or more current events, or one or more attributes associated with one or more of the connection users, as discussed above.

According to an example embodiment, an output to the first device user indicating the one or more results associated with the first question may be initiated (516). For example, the result output engine 238 may initiate an output to the first device user 108 indicating the one or more results 222 associated with the first question 206, as discussed above.

According to an example embodiment, an output to the first device user indicating other questions associated with one or more of the connection users may be initiated (518). For example, the related question output engine 240 may initiate an output to the first device user 108 indicating other questions 242 associated with one or more of the connection users, as discussed above.

According to an example embodiment, an output to the first device user indicating the content of the second question and one or more search links to descriptive information describing the content included in the second question may be initiated (520). For example, the question output engine 244 may initiate an output to the first device user 108 indicating the content 246 of the second question and one or more search links 248 to descriptive information describing the content 246 included in the second question, as discussed above.

According to an example embodiment, an indication of one or more first network users associated with a first network may be received, the first network users associated with the first device user based on one or more friend connections to the first device user in the first network (522). For example, the connection receiving engine 250 may receive an indication of one or more first network users associated with a first network, the first network users associated with the first device user 108 based on one or more friend connections to the first device user 108 in the first network, as discussed above.

Figure 6:
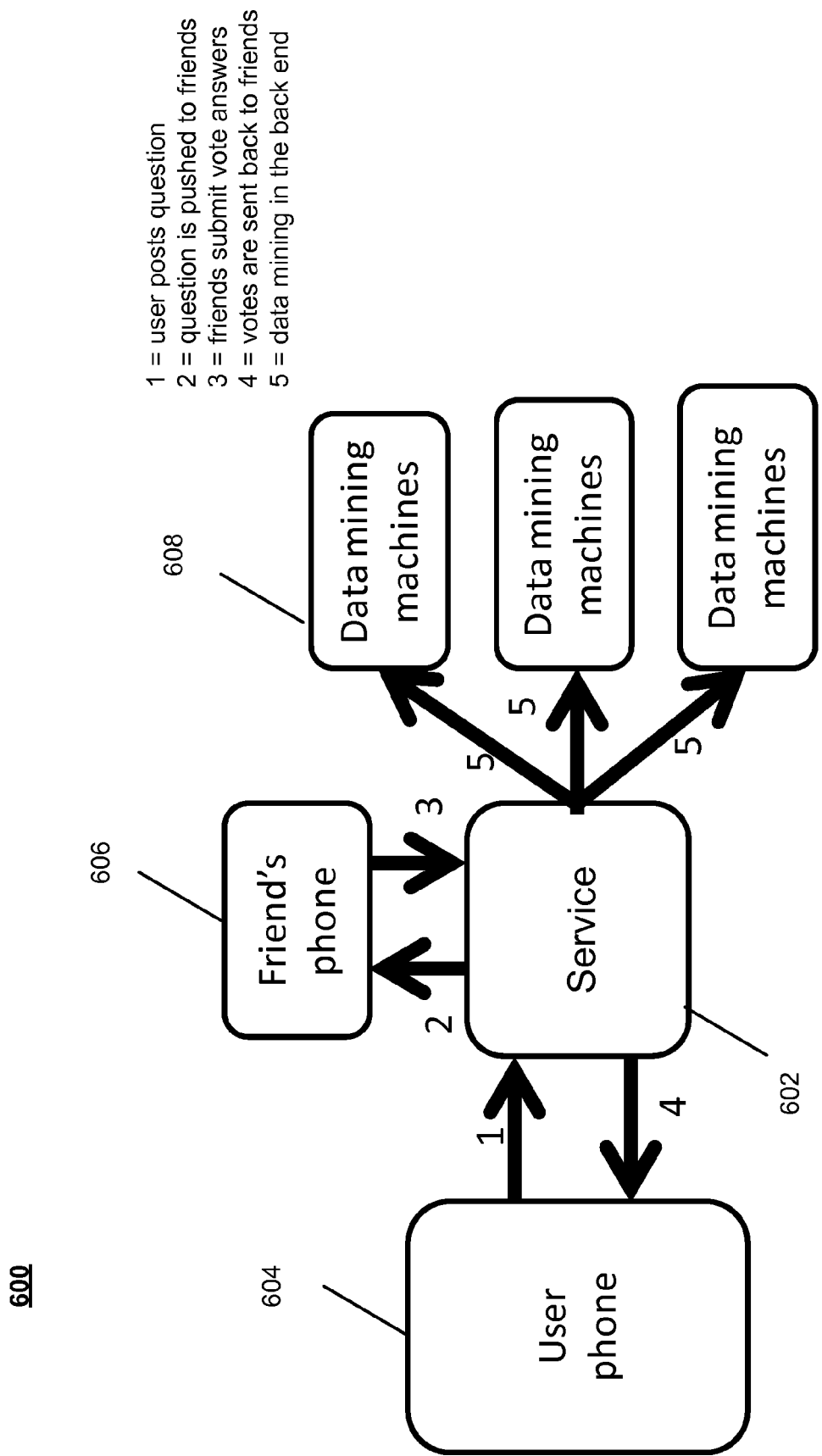
FIG. 6 is a block diagram depicting an example system structure that includes example implementations associated with the systems of FIG. 1 and FIG. 2.

FIG. 6 is a block diagram depicting an example simplified overall system structure that includes example implementations associated with the systems of FIG. 1 and FIG. 2. As shown in FIG. 6, a service 602 may communicate with a user phone 604, a friend's phone 606, and data mining machines 608.

For example, the service 602 may include the question processing manager 102 of FIG. 1, and the user phone 604 and friend's phone 606 may each include the question processing receiving engine 202 of FIG. 2.

As shown in FIG. 6, the user phone 604 may transmit a posted question to the service 602, and the service 602 may push the question to friends of the user of the user phone 604, as discussed above with regard to FIGS. 1 and 2.

In response to the question, the friends may provide an answer, which may then be transmitted from the friend's phone 606 to the service 602. The service 602 may process answers received from responding friends of the user, and may post results (e.g., tallies of votes received), via posting on a web site or via transmission to users of the service 602. For example, the service 602 may send the result to the user phone 604 so that the requesting user may receive results quickly.

According to an example embodiment, the data mining machines 608 may analyze many different sources of information, for example, for use in inferences for helping users (e.g., requestors and their friends) reach their respective individual decisions regarding asking questions, answering questions, and actions to take based on their decisions.

Figure 7:
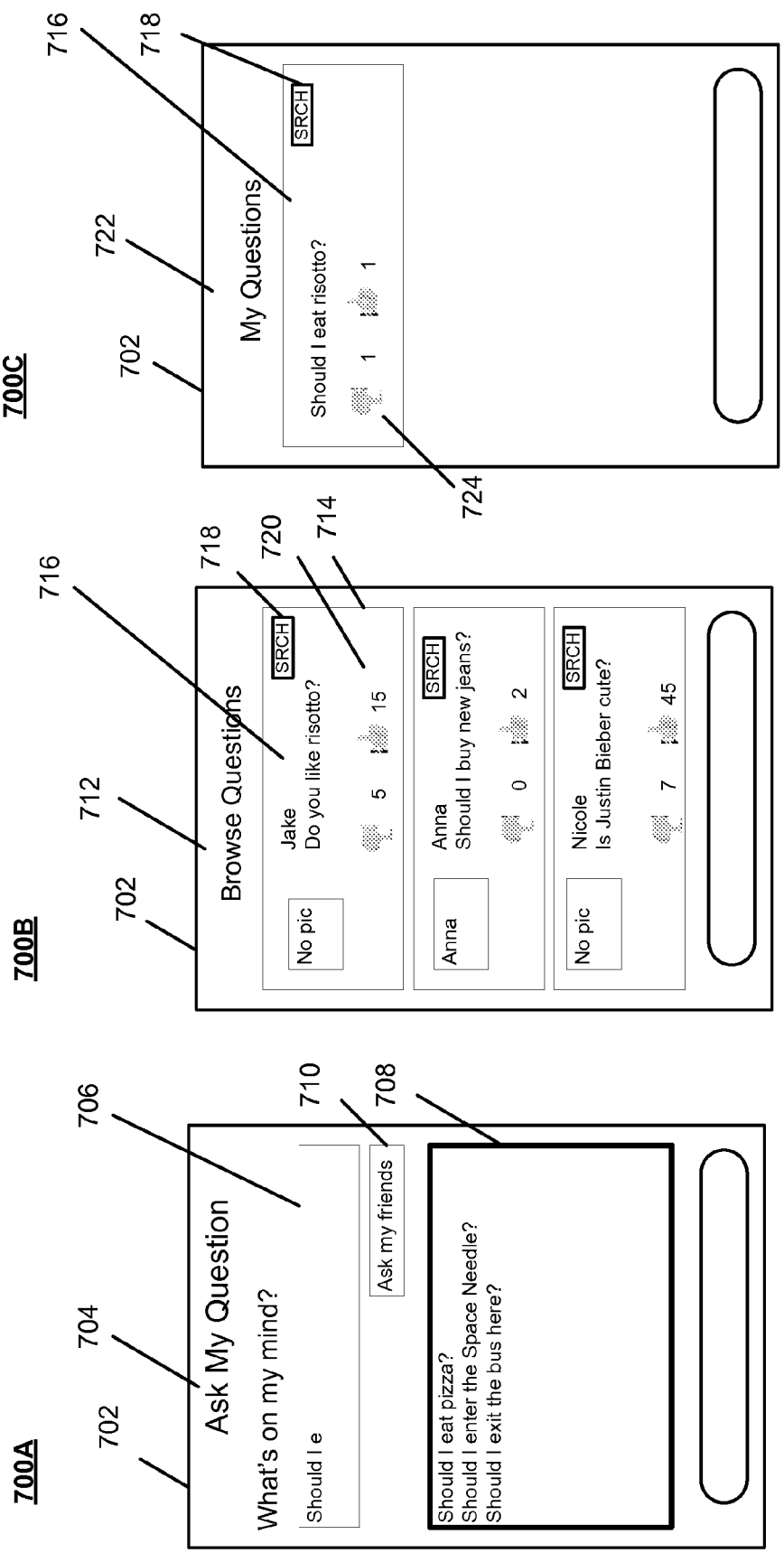
FIGS. 7A-7C depict example user views of example graphical displays on a device.

FIGS. 7A-7C depict example user views of example graphical displays on a device. According to an example embodiment, techniques discussed herein may provide a question processing system. As shown in FIG. 7, a user may ask questions and may receive responses to the questions from friends of the user. For example, a device 702 may correspond to the receiving device 114 discussed above with regard to FIGS. 1 and 2. A displayed screen 704 may provide a user with areas for viewing information that may be relevant to submitting a question for transmission to friends of the user. For example, the first user 108 may enter a question in a text box 706 in response to a prompt indicated as "What's on my mind?". As shown in FIG. 7A, the first user 108 may enter text in the text box 706, as suggestion questions are presented in a suggestion box 708 (e.g., user suggestion questions 168 as determined by the suggestion determination engine 166, and transmitted to the device 702 via the suggestion output engine 170, as discussed above).

As discussed above, when the first user 108 activates the application associated with the screen of the device 702, an intent to ask a question may be transmitted to the question processing manager 102, and received by the intent receiving engine 162. The suggestion determination engine 166 may determine user suggestion questions 168, for example, based on information obtained from the content graph 128, from information received by the intent receiving engine 162 (e.g., current location of device 702, time of day associated with device 702), and from other sources (e.g., season, current events, popular entities, current sales events) that may be obtained from web sources or other libraries of information. For example, a history of questions asked/answered recently by the first user 108 may be provided as user suggestion questions 168 (e.g., obtained from the content graph 128).

According to an example embodiment (not shown), the first user 108 may also receive prompts via audio transmission, or any other form of user output discernable to the first user 108. According to an example embodiment, the user suggestion questions 168 may be presented to the first user 108 via audio transmission, and the first user 108 may provide the question 106 via voice commands (or via any other form of input discernable to the first user 108 and the device 702). Thus, the display 116 is not limited to a graphical display as shown in FIG. 7A, but may also include one or more devices that provide input/output between the device 702 and the first user 108 (e.g., microphones and speakers for audio input/output).

When the first user 108 has determined the question 106 as entered in the text box 706 of FIG. 7A, the first user 108 may activate a submit button 710 (indicated as "Ask my friends" in FIG. 7A) to request transmission of the question 106 to the question processing manager 102, for transmission to friends of the first user 108.

As shown in FIG. 7B, a "Browse Questions" 712 feature may provide a list 714 of questions asked by friends of the first user 108, with results updated as of a time of the refresh operation by the first user 108 on the device 702. According to an example embodiment, the first user 108 may refresh a screen 712 to receive currently asked questions 106, asked by friends of the first user 108, in real time. As shown in FIG. 7B, a question 716 from Jake may inquire whether friends of Jake like risotto.

As shown in FIG. 7B, activation of a search button 718 may provide additional information for helping a first user 108 to learn more about the question content. For example, if the question includes a reference to visiting "Zixxleberg", then the question content determination engine 144 may initiate mining of sources of data to determine information that might be helpful/relevant for users to better understand the question, before submitting a response, and may associate the information with the search button 718 (e.g., via the search link 136, as discussed above). For example, the question content determination engine 144 may obtain information associated with other questions relating to "Zixxleberg", asked by other users, to determine a context for the term (e.g., a fictional place referenced in a comic book several generations ago, or a sandwich offered briefly by a local restaurant).

As shown in FIG. 7B, a "thumbs up/thumbs down" results area 720 indicates current results associated with answers already received for the risotto question (e.g., 5 down, 15 up in this example). If the first user 108 (e.g., a user named John) is a user selected to receive the question for a response, then the first user 108 may provide a response, for example, by activating an icon for "thumbs up" or "thumbs down" (e.g., yes/no response).

As shown in FIG. 7C, a "My Questions" 722 feature may provide a list of questions provided by the first user 108, with results 724 provided so far by friends of the first user 108. According to an example embodiment, the friends submitting responses may provide the responses anonymously, and thus the first user 108 may not know who responded. According to an example embodiment, the friends may agree to let the first user 108 know who provided the responses, and the first user 108 may be able to view a list of responders, with respective responses, via a click or activation of one of the results icons (e.g., up or down icon).

According to an example embodiment, the search button 718 of FIG. 7C may provide the first user 108 with information regarding satisfaction of elements of the question 106. For example, if the first user 108 submitted a question 106 regarding eating risotto, the question content determination engine 144 may determine that a restaurant near the current location of the first user 108 is associated with favorable comments regarding their risotto (e.g., via a search engine that provides rankings and location information), or that a particular type of risotto may taste better than other types, and may provide links to the rankings, type, and location information with the search link 136. The first user 108 may then access the information via one click of the search button 718 of FIG. 7C, to make informed, quick decisions.

Figure 8:
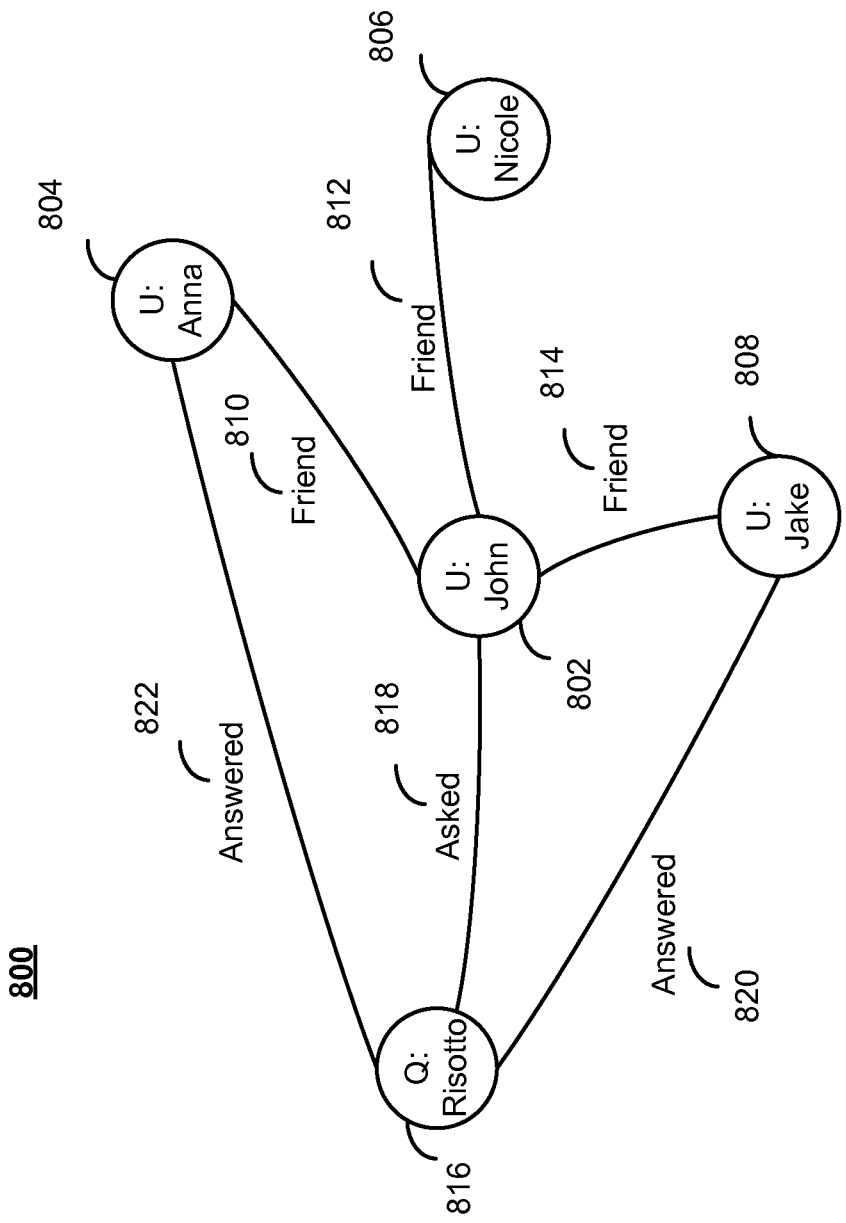
FIG. 8 depicts an example content graph.

FIG. 8 depicts an example content graph. As shown in FIG. 8, a content graph 800 may include user nodes 802, 804, 806, and 808 associated with users John, Anna, Nicole, and Jake, respectively. As shown in FIG. 8, the user nodes 804, 806, and 808 are connected to the user node 802 via edges 810, 812, 814, respectively, indicating "Friend" relationships with the user node 802. Thus, the content graph 800 indicates that users Anna, Nicole, and Jake are friends with John (e.g., connection users (Anna, Nicole, and Jake) having a connection user association with the first user 108 (John) in the content graph 128, as discussed above).

As shown in FIG. 8, a question node 816 represents a question regarding "risotto" (e.g., the question "Should I eat risotto?" as shown in FIG. 7c). As shown in FIG. 8, the user node 802 is connected to the question node 816 via an edge 818, indicating an "Asked" relationship with the question node 816. As shown in FIG. 8, the user nodes 808 and 804 are connected to the question node 816 via edges 820 and 822, respectively, indicating "Answered" relationships with the question node 816.

Thus, the content graph 800 of FIG. 8 indicates that John asked a question regarding risotto, and that John's friends Jake and Anna provided responses to the risotto question.

According to an example embodiment, the responses to questions may be stored in the content graph 800, for example, as separate response nodes related to the respective question, the respective responder/user node, and to the originator/user node of the question, or the responses may be stored with the question nodes and/or the respective responder/user nodes. Cumulative results may be stored in association with respective question nodes. Thus, according to an example embodiment, a user/responder may be able to change his/her response after initial submission.

According to an example embodiment, attributes associated with nodes may be stored in association with the nodes (e.g., as lists, linked lists, hash tables). For example, histories and demographic information associated with individual users may be stored in association with the user nodes.

The content graph 800 of FIG. 8 is shown as including a question node, four user nodes, and edges representing friend relationships and relationships of asking and answering a question; however, the content graphs 128 and 800 may include a very large number of nodes and edges, and may support a very large number of node types and edge types.

Example techniques discussed herein may thus provide systems for quick and efficient question and answer/opinion interplay between friends in a mobile setting. For example, questions and results may be served in real-time to clients through a web service. If clients are not currently available online, questions may be pushed to candidate responders via instant messages, email, phone call, or any other communication means specified by each respective user.

Customer privacy and confidentiality have been ongoing considerations in online environments for many years. Thus, a service for processing questions may provide user information regarding risks associated with the user providing personal information, for example, for use in association with a user profile. An example service for processing questions may offer options for a potential user to use the service on individual one-time sessions in lieu of a subscription in which the user information may be persistently stored for retrieval upon subsequent requests for information regarding questions related to their friends.

A service for processing questions may also request permission from potential users before sharing user information with sponsors such as companies providing advertising or coupons. An example service for processing questions may inform a potential user that he/she may receive a list of relevant questions/results, and that the user may decline to provide personal information other than an online address (i.e., as a target for transmitting the questions/results) and any other optional information that the user may elect to provide (e.g., a gender, an age range, an income range, an ethnicity, personal preferences permission), for use in updating/upgrading logic for processing questions for all users of the service. For example, a prospective user may wish to view a demo of the service, and may receive lists that have been approved for dissemination to users external to a group of connected friends.

An example service for processing questions may request an email address for sending an email to confirm permission before user personal information is entered into the system, to ensure that the user is informed of potential risks of electronically stored personal/private information. Further, authentication techniques may be included in order for the user to continue to use the service for processing questions. For example, a user identifier and password may be requested for future access to the system. As another example, an authorized fingerprint or audio identification (e.g., via voice recognition) may be requested for the access. Additionally, access to networked elements of the system may be provided via secured connections (or hardwired connections), and firewalls may be provided to minimize risk of potential hacking into the system.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A system comprising:
at least one hardware device processor; and
a machine readable storage device storing executable instructions that, when executed, cause one or more of the at least one device processor to:
receive an indication from a first user of an intent to generate a user question;
determine one or more user suggestion questions based on accessing a first user node in a content graph, the first user node associated with the first user;
receive an indication of a question from the first user;
determine a first group of connection users having a connection user association with the first user in the content graph;
initiate a transmission of the indication of the question and a search link that is determined by the system based on content of the question, to each of at least a portion of the connection users included in the first group;

receive one or more first responses from one or more of the connection users included in the at least a portion of the connection users;

initiate a first update to the content graph, after receipt of the indication of the question at the question input engine, the first update including an addition of a first node associated with the received indication of the question and a first link associating the first user with the first node, the first link indicating an action of asking the question represented by the first nodes; and initiate a second update to the content graph, after receipt of one of the first responses at the response receiving engine, the second update including an addition of a second link associating one of the connection users associated with one of the received first responses, with the first node, the first link indicating an action of answering the question.

2. The system of claim 1, wherein:
determining the one or more user suggestion questions includes determining the one or more user suggestion questions based on one or more of:
a history of questions associated with the first user, one or more attributes associated with the first user, or a partial query received from the first user.

3. The system of claim 1, wherein the executable instructions, when executed, cause the one or more of the at least one device processor to:
initiate a transmission of one or more indications of the one or more user suggestion questions to a device associated with the first user, wherein the one or more indications of the one or more user suggestion questions include one or more of:
a prompt via an output device, a text user suggestion question, or a form of user output that is discernable to the first user.

4. The system of claim 1, wherein:
determining the intent to generate the user question includes determining the intent to generate the user question based on receiving an indication that the first user requests a display or interactive application for providing information associated with the user question.

5. The system of claim 1, wherein the executable instructions, when executed, cause the one or more of the at least one device processor to:
determine a ranking of the connection users included in the first group based on comparing attributes associated with each of the connection users included in the first group and attributes associated with content of the question; and
determine the at least a portion of the first group of connection users based on the determined ranking.

6. The system of claim 5, wherein:
determining the ranking includes determining the ranking based on one or more of:
location information associated with the connection users, a connection user preference associated with the first user, location information associated with the first user, history information associated with the connection users, or history information associated with the first user.

7. The system of claim 1, wherein:
the second update includes an addition of a third node associated with the first response, and a third link associating the third node with the first node, the third link indicating an answer relationship between the question and the first response.

8. The system of claim 1, wherein the executable instructions, when executed, cause the one or more of the at least one device processor to:
initiate a third update to the content graph, the third update including an update to a first user node in the content graph, the first user node associated with the first user, the third update including updating one or more of:
demographic information associated with the first user, location information associated with the first user, preference information associated with the first user, or behavior information associated with the first user.

9. A method comprising:
receiving an indication from a first user of an intent to generate a user question;
determining, via a device processor, one or more user suggestion questions based on accessing a first user node in a content graph, the first user node associated with the first user;
receiving an indication of a question from the first user;
determining a first group of connection users having a connection user association with the first user in the content graph;
initiating a transmission of the indication of the question and a search link that is determined by a computing system based on content of the question, to each of at least a portion of the connection users included in the first group;
receiving one or more first responses from one or more of the connection users included in the at least a portion of the connection users;
initiating a first update to the content graph, after receipt of the indication of the question, the first update including an addition of a first node representing the received indication of the question and a first link associating the first user with the first node, the first link indicating an action of the first user asking the question represented by the first node; and
initiating a second update to the content graph, after receipt of one of the first responses at a response receiving engine, the second update including an addition of a second link associating one of the connection users associated with the one of the received first responses, with the first node, the second link indicating an action of the one of the connection users answering the question.

10. The method of claim 9, wherein:
the one or more user suggestion questions is determined based on one or more of:
a history of questions associated with the first user, one or more attributes associated with the first user, or a partial query received from the first user.

11. The method of claim 9, further comprising:
initiating a transmission of one or more indications of the one or more user suggestion questions to a device associated with the first user, wherein the one or more indications of the one or more user suggestion questions include one or more of:
a prompt via an output device, a text user suggestion question, or a form of user output that is discernable to the first user.

12. The method of claim 9, wherein:
the intent to generate the user question is determined based on receiving an indication that the first user requests a display or interactive application for providing information associated with the user question.

13. The method of claim 9, further comprising:
determining a ranking of the connection users included in the first group based on comparing attributes associated with each of the connection users included in the first group and attributes associated with content of the question; and determining the at least a portion of the first group of connection users based on the determined ranking.

14. The method of claim 13, wherein:
the ranking is determined based on one or more of:
location information associated with the connection users, a connection user preference associated with the first user, location information associated with the first user, history information associated with the connection users, or history information associated with the first user.

15. A computer program product comprising a machine readable storage device storing executable code that, when executed, causes one or more device processors to:
receive an indication from a first user of an intent to generate a user question;
determine one or more user suggestion questions based on accessing a first user node in a content graph, the first user node associated with the first user;
receive an indication of a question from the first user;
determine a first group of connection users having a connection user association with the first user in the content graph;
initiate a transmission of the indication of the question and a search link that is determined by a computing system based on content of the question, to each of at least a portion of the connection users included in the first group;
receive one or more first responses from one or more of the connection users included in the at least a portion of the connection users;
initiate a first update to the content graph, after receipt of the indication of the question, the first update including an addition of a first node representing the received indication of the question and a first link associating the first user with the first node, the first link indicating an action of the first user asking the question represented by the first node; and
initiate a second update to the content graph, after receipt of one of the first responses at a response receiving engine, the second update including an addition of a second link associating one of the connection users associated with the one of the received first responses, with the first node, the second link indicating an action of the one of the connection users answering the question.

16. The computer program product of claim 15, wherein the executable code, when executed, causes the one or more device processors to:
determine the one or more user suggestion questions based on one or more of:
a history of questions associated with the first user, one or more attributes associated with the first user, or a partial query received from the first user.

17. The computer program product of claim 15, wherein the executable code, when executed, causes the one or more device processors to:
initiate a transmission of one or more indications of the one or more user suggestion questions to a device associated with the first user, wherein the one or more indications of the one or more user suggestion questions include one or more of:
a prompt via an output device, a text user suggestion question, or a form of user output that is discernable to the first user.

18. The computer program product of claim 15, wherein the executable code, when executed, causes the one or more device processors to:
determine the intent to generate the user question based on receiving an indication that the first user requests a display or interactive application for providing information associated with the user question.

19. The computer program product of claim 15, wherein the executable code, when executed, causes the one or more device processors to:
determine a ranking of the connection users included in the first group based on comparing attributes associated with each of the connection users included in the first group and attributes associated with content of the question; and
determine the at least a portion of the first group of connection users based on the determined ranking.

20. The computer program product of claim 19, wherein the executable code, when executed, causes the one or more device processors to:
determine the ranking based on one or more of:
location information associated with the connection users, a connection user preference associated with the first user, location information associated with the first user, history information associated with the connection users, or history information associated with the first user.

* * * * *